United States Patent
Deforge et al.

(10) Patent No.: US 12,095,517 B2
(45) Date of Patent: Sep. 17, 2024

(54) POWER DETECTION IN THE TIME DOMAIN ON A PERIODIC BASIS WITH STATISTICAL COUNTERS

(71) Applicant: Dell Products L.P., Round Rock, TX (US)

(72) Inventors: John Bradley Deforge, Chelsea (CA); Sewvanda Don, Ottawa (CA); Tommy Ivarsson, Ottawa (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 18/534,885

(22) Filed: Dec. 11, 2023

(65) Prior Publication Data
US 2024/0106549 A1   Mar. 28, 2024

Related U.S. Application Data

(62) Division of application No. 17/710,795, filed on Mar. 31, 2022, now Pat. No. 11,881,904.

(51) Int. Cl.
*H04B 17/18* (2015.01)
*H04B 17/29* (2015.01)

(52) U.S. Cl.
CPC ............ *H04B 17/18* (2015.01); *H04B 17/29* (2015.01)

(58) Field of Classification Search
CPC ....... H04B 17/18; H04B 17/29; H04B 17/102
See application file for complete search history.

(56) References Cited

U.S. PATENT DOCUMENTS

| | | | |
|---|---|---|---|
| 4,411,858 A | 10/1983 | Smith | |
| 5,251,151 A | 10/1993 | Demjanenko et al. | |
| 2006/0056528 A1* | 3/2006 | Jung | H04L 27/2613 375/260 |
| 2009/0041527 A1* | 2/2009 | Ohashi | G06K 7/10336 400/613 |
| 2010/0134626 A1 | 6/2010 | Icho et al. | |
| 2010/0300683 A1 | 12/2010 | Looper et al. | |
| 2013/0281148 A1* | 10/2013 | Seyama | H04W 52/30 455/522 |
| 2015/0271687 A1 | 9/2015 | Fechtel | |

(Continued)

OTHER PUBLICATIONS

U.S. Appl. No. 17/710,795, filed Mar. 31, 2022.
(Continued)

*Primary Examiner* — Dominic E Rego
(74) *Attorney, Agent, or Firm* — Amin, Turocy & Watson, LLP

(57) ABSTRACT

Technology described herein can gather and statistically analyze time domain power data for enabling real-time adjustment of one or more parameters of a radio system. In an embodiment, a system can comprise a processor and a read circuit communicatively coupled to the processor, wherein the processor controls the read circuit to read power data in a time domain from a radio system, and an analysis component communicatively coupled to the processor, wherein the analysis component compares the power data in the time domain to a power threshold, and wherein, based on a result of the power data being compared to the power threshold, the analysis component sorts the power data into bins at a storage component communicatively coupled to the processor.

20 Claims, 13 Drawing Sheets

(56) References Cited

U.S. PATENT DOCUMENTS

| | | |
|---|---|---|
| 2015/0327244 A1 | 11/2015 | Pajukoski et al. |
| 2016/0036571 A1 | 2/2016 | Park et al. |
| 2016/0226613 A1 | 8/2016 | Chen et al. |
| 2017/0105223 A1 | 4/2017 | Zhang et al. |
| 2020/0358541 A1* | 11/2020 | Dell'Amico ........ H04L 27/2646 |
| 2021/0225360 A1 | 7/2021 | Feng et al. |
| 2022/0257149 A1 | 8/2022 | Ralston et al. |
| 2023/0139907 A1 | 5/2023 | Shahid et al. |

OTHER PUBLICATIONS

Oran, "O-RAN Alliance", https://www.o-ran.org, Retrieved from the Internet: Jun. 13, 2022, 8 pages.
Telecom Infra Project, "OpenRAN", https://telecominfraproject.com/openran/, Retrieved from the Internet: Jun. 13, 2022, 28 pages.
Invitation to Pay Additional Fees received for PCT Application No. PCT/US2022/053061 dated Apr. 24, 2023, 12 pages.
International Search Report and Written Opinion received for PCT Application No. PCT/US2022/053061 dated Jun. 15, 2023, 18 pages.
Notice of Allowance received for U.S. Appl. No. 17/710,795 dated Sep. 14, 2023, 34 pages.

\* cited by examiner

POWER DETECTION IN THE TIME DOMAIN ON A PERIODIC BASIS WITH STATISTICAL COUNTERS

RELATED APPLICATION

The subject patent application is a divisional of, and claims priority to, U.S. patent application Ser. No. 17/710, 795, filed Mar. 31, 2022, and entitled "POWER DETECTION IN THE TIME DOMAIN ON A PERIODIC BASIS WITH STATISTICAL COUNTERS," the entirety of which priority application is hereby incorporated by reference herein.

BACKGROUND

Modern cellular systems continue to advance, where dynamic changes can be made to improve one or more aspects and/or to provide one or more new services and/or other aspects. These dynamic changes can benefit from knowledge, information and/or data regarding how a system is functioning, system issues, troubleshooting performance and/or adjustments made to address functions and/or issues. That is, such knowledge, information and/or data relative to hardware, firmware and/or software can be useful in proactively addressing such issues, performing troubleshooting, and/or overall, improving one or more systems, and/or subsystems of such cellular systems, such as of related radio systems.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for time domain power detection. Time domain power detection can be performed on data at a radio system, such as at the digital front end, where data is natively in the time domain Ability to detect power in the time domain can enable the ability to precisely extract power of a signal at a predetermined point, such as a tap point, such as gated over a selected period of time. That power data can be resolved to a degree for measuring radio performance. Time alignment of the data can enable input to output comparison (e.g., relative to input/output of a respective digital front end), and/or can enable comparison at different points of an input chain and/or at different points of an output chain.

An example method can comprise analyzing, by a system comprising a processor, at a system of a radio system, power data in a time domain that is sorted according to a power threshold, storing, by the system, the power data in the time domain at a storage component, wherein the power data in the time domain is stored into a group of bins based on the sorting of the power data in the time domain, and counting, by the system, respective quantities of power data values at respective bins of the group of bins.

An example system can comprise a processor and a read circuit communicatively coupled to the processor, wherein the processor controls the read circuit to read power data in a time domain from a radio system, and an analysis component communicatively coupled to the processor, wherein the analysis component compares the power data in the time domain to a power threshold, and wherein, based on a result of the power data being compared to the power threshold, the analysis component sorts the power data into bins at a storage component communicatively coupled to the processor.

Another example system can comprise a group of power detectors configured to detect collection of respective power data in a time domain from a group of locations along an uplink path or a downlink path of a radio system, wherein respective power detectors of the group of power detectors are configured to detect data relative to respective different time ranges of the time domain, wherein the system is configured to correlate the different time ranges of the time domain to one another, and wherein the power detectors of the group of power detectors comprise statistical counters that are configured to accumulate respective counts of power data values at bins of a data storage component.

BRIEF DESCRIPTION OF THE DRAWINGS

The technology described herein is illustrated by way of example and not limited to the accompanying figures, in which like reference numerals indicate similar elements.

DETAILED DESCRIPTION

Overview

Figure 1:
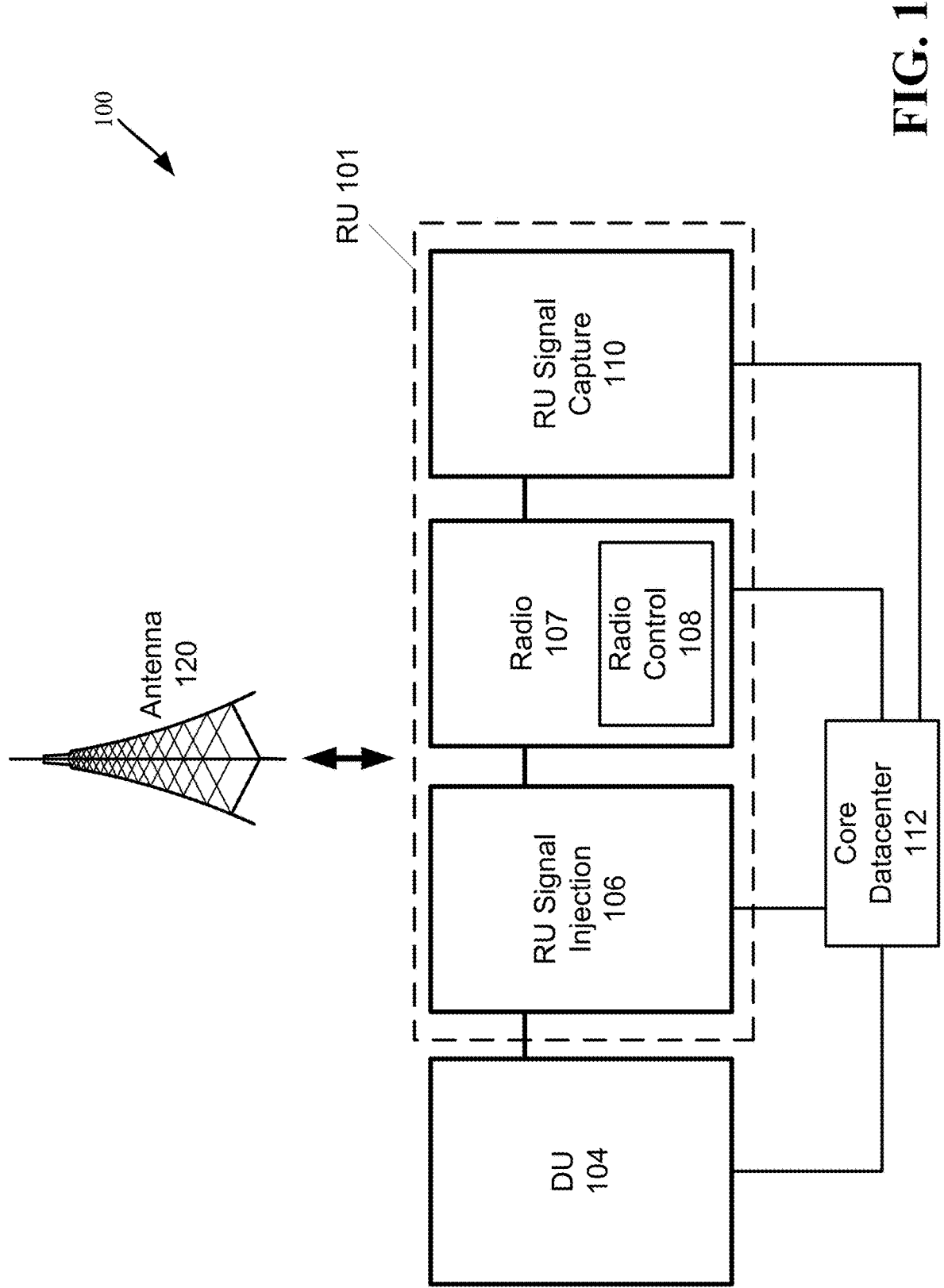
FIG. 1 illustrates a schematic representation of example elements of a radio system, in accordance with one or more embodiments and/or implementations described herein.

The technology described herein is generally directed towards a process to collect, synchronize and/or analyze data, such as power data, in the time domain of a radio system. The technology described herein can perform one or more of such operations in a hardware accelerated manner That is, radio system reliability, serviceability and manageability are all aspects of a functioning radio system of a cellular system that are important both to the user and the provider. These aspects can benefit from knowledge, information and/or data/metadata gained from tracking, collecting, mapping and/or analyzing performance of a radio system. That is, there is a benefit to measuring radio performance, and/or to generating and/or storing data in one or more ways that can allow for comparative analysis of such data (including metadata) that is collected from different sources, at different time points, and/or relative to one or more other dynamic and/or changing variables.

The data collected and/or statistically analyzed, and/or the results of analysis of the data, can allow for real-time, immediate, short term and/or long term improvements, troubleshooting and/or predictive modeling regarding radio system performance, failures, issues, continuity and/or other aspects. For example, the resulting "clean" and/or statistically accumulated data, such as telemetry, radio frequency (e.g., analog data) and/or digital performance and/or comparative data, and/or underlying infrastructure utilization statistics, can be used to improve network performance, plan network capacity, and/or identify new service opportunities, relative to the radio system. Various types of data can be collected, such as, but not limited to, data represented in a frequency domain (FD) and/or data represented in a time domain (TD). As used herein, the term "clean" can refer to non-statistically analyzed data.

Generally, one or more embodiments described herein are directed to detection, statistical analysis, and storage of radio system power data in the time domain. The power data can be synchronized along system timing boundaries. Generally, the power data can be employed to provide proactive and reactive responses, updates and/or troubleshooting of a respective radio system of a cellular system. More particularly, one or more embodiments here can facilitate an ability of a service provider (of and/or associated with a radio system) to precisely extract power of a signal at known and synchronized periods of time, and to resolve that data on a periodic basis. In one or more embodiments, power data over various time ranges, from differing tap points of different sections and/or chains of a radio system can be measured, which power data can be used, as mentioned above, relative to managing performance, system operation, maintenance and/or customer experience of the respective radio system.

That is, in one or more embodiments, power detector data can be accumulated (e.g., read and recorded, and selectively binned) on a periodic basis over time, such as gathering power data of every symbol going into a respective power amplifier (PA). Simultaneously and/or synchronously, power data can be gathered that is fed back from the PA. Additionally and/or alternatively, such power data can be looped to an uplink (UL) path and simultaneously and/or synchronously gathered.

Using the one or more embodiments described herein, such clean and statistically analyzed data can not only be collected and measured, but also recorded, stored and recalled, such as automatically and/or employing artificial intelligence, machine learning, deep learning and/or the like to proactively and/or reactively address the performance, system operation, maintenance and/or customer experience of the respective radio system.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, thermal power, size, weight and/or the like.

As used herein, the term "resource" can refer to power, money, memory, processing power and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1200 illustrated at FIG. 12. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio system architecture is illustrated at 100. The radio system 100 can comprise a distributed unit (DU) signal injection portion 104 (also herein referred to as a DU portion 104) and a radio unit (RU) 101. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. The RU signal capture portion 110 can have one or more statistical counters, accumulators, counter circuits and/or the like.

In one or more embodiments, the RU signal capture portion 110 can analyze data captured, such as via historical information. This analysis and data gathering can be performed at least partially autonomously, such as via majoratively and/or fully autonomously, such as absent input from the DU portion 104 and/or any centralized unit (CU). In one or more embodiments, the radio control 108, in view of information received from the RU signal capture portion 110, can place an order for service, maintenance, hardware and/or firmware to a core data center 112. In one or more embodiments, the radio control 108, in view of information received from the RU signal capture portion 110, can at least partially autonomously request or request and receive one or more software, firmware and/or other system updates. Together, the DU portion 104 and RU portion 106 can provide data to, and receive data from, the core datacenter 112.

Figure 2:
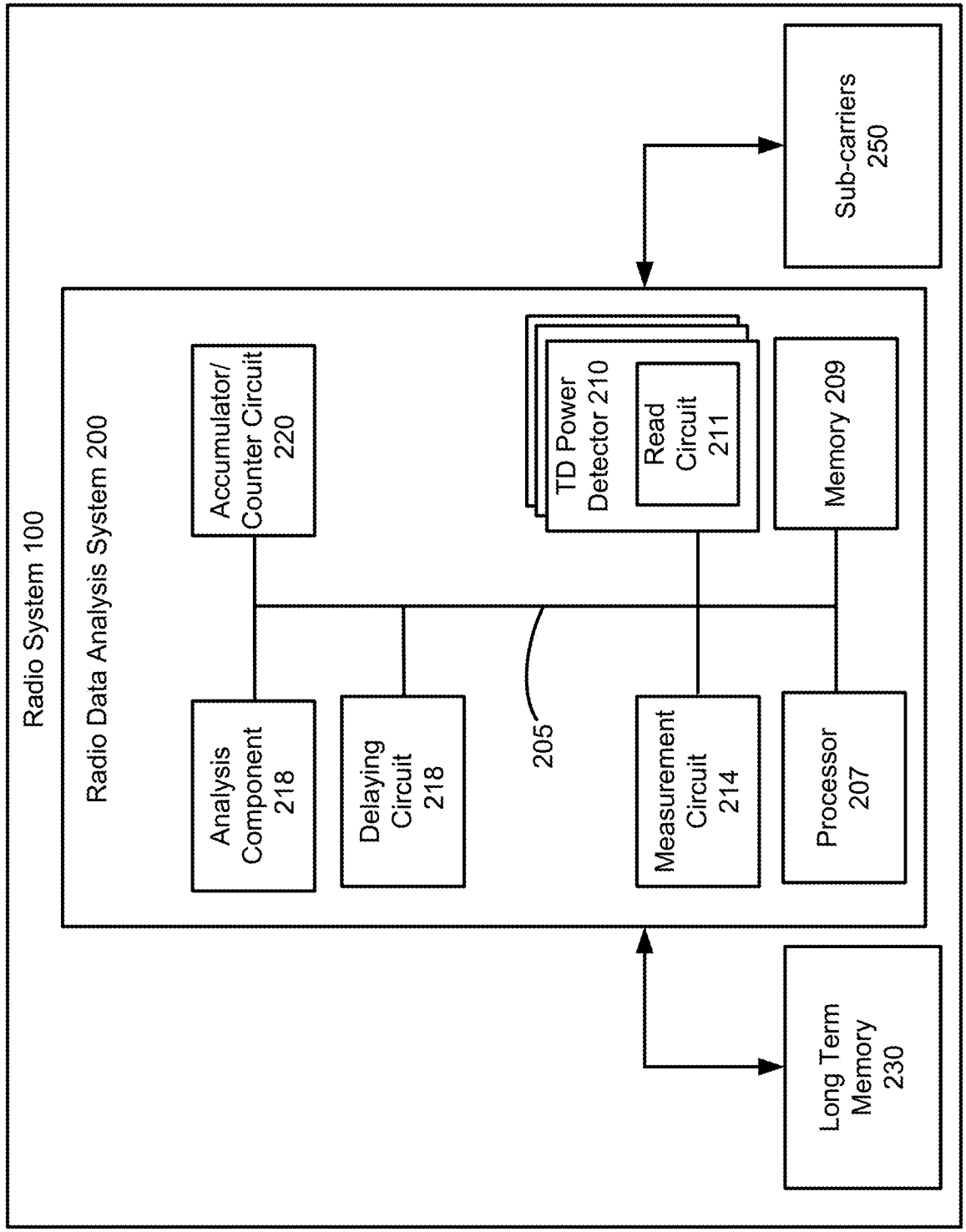
FIG. 2 illustrates another schematic representation of the radio system of FIG. 1, comprising a radio data analysis system, in accordance with one or more embodiments and/or implementations described herein.

Turning next to FIG. 2, an example of a radio data analysis system architecture is illustrated at 200, with description being provided below. The radio data analysis system 200 can be part of the radio system 100 (e.g., of FIG. 1) or can be at least partially external to the radio system 100. For purposes of brevity, additional aspects of the radio system 100 (e.g., as illustrated at FIG. 1) are not illustrated at FIG. 2. While referring here to one or more processes, operations, facilitations and/or uses of the non-limiting system architecture 200, description provided herein, both above and below, also can be relevant to one or more other non-limiting system architectures described herein.

FIG. 2 illustrates a schematic of the radio data analysis system 200 for detecting, reading and gathering power data in the time domain relative to one or more known periods of time, which can be aligned to one another, such as relative to time boundaries of the radio system 100. Generally, the power data in the time domain can be read and collected at various tap points of the radio system 100, where the power data is natively in the time domain.

Generally, the radio data analysis system 200 can comprise any suitable computing devices, hardware, software, operating systems, drivers, network interfaces and/or so forth. However, for purposes of brevity, only components generally relevant to time domain power data detection, collection and/or analysis are illustrated in FIG. 2. For example, the radio data analysis system 200 can comprise a processor 207, memory 209, time domain power detector 210, read circuit 211, delaying circuit 218, measurement circuit 214, analysis component 218 and/or accumulator/counter circuit 220.

Discussion first turns to the processor 207, memory 209 and bus 205 of the radio data analysis system 200.

In one or more embodiments, radio data analysis system 200 can comprise the processor 207 (e.g., computer processing unit, microprocessor, classical processor and/or like processor). In one or more embodiments, a component associated with radio data analysis system 200, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction (s). In one or more embodiments, the processor 207 can comprise the measurement circuit 214, delaying circuit 218, analysis component 218 and/or accumulator/counter circuit 220.

The processor 207 can be configured to control one or more components/elements of the radio data analysis system 200, such as the power detector 210, read circuit 211, delaying circuit 218, measurement circuit 214, analysis component 218 and/or accumulator/counter circuit 220. That is, the processor 207 can be configured to control collection of power data relative to the radio system 100.

It is noted that the radio system 100 comprises a plurality of subcarriers 250, and that data collected in the time domain is generally collected relative to such subcarriers 250, in the sense that power data in the time domain over a range of time can is data relative to the various subcarriers of a range (e.g., symbol of 1 period) of that time. In one or more embodiments, the radio system 100 can have subcarrier spacing such as 30 KHz spacing or numerology 1 spacing.

As used herein, a subcarrier is a sideband of a radio frequency carrier wave, which can be modulated. An operating radio system, such as the radio system 100, can have a plurality of subcarriers, such as subcarriers 250 numbered from 0, 1, 2 . . . to j. Subcarrier spacing at the radio system 100 can be based on the numerology configuration of the system.

Additionally, generally at a radio system, the more subcarriers that can be packed into a frequency range (i.e., the narrow subcarrier spacing used), the more data that can be transmitted and/or received. In one example, the radio system 100 can have subcarrier spacing of about 30 KHz or numerology 1. Based on physics (e.g., anti-proportional relationship between subcarrier spacing and orthogonal frequency division multiplexing—OFDM—symbol length), narrow subcarrier spacing can correspond to longer OFDM symbol length. Longer OFDM symbol length can correspond to additional spacing for CP (cyclic prefix). With longer CP, the signal can be more tolerable to a fading channel.

The processor 207 can be configured to control collection of power data in the time domain at various resolutions and over various known periods of time. The known periods/ranges of time can be synchronized to one another via one or more time-alignment operations, time stamps and/or the like, such as by the processor 207.

For example, in one or more embodiments, sampling resolution can be determined by a highest sampling rate and/or number of samples collected (the period), such as at least 16 samples. Sampling rates can vary depending on which block of a DFE chain is being tapped for data detected. Internal blocks of a DFE can run as high as 491.52 Msps, or higher, with a poly-phase configuration with a bit width of 16 bit for both I and Q. Parallel paths shall be supported simultaneously.

In one or more embodiments, a time range over which power data can be detected can be a period of a symbol, sub-period of a symbol, or multiple symbol periods, for example. An exemplary case of sub-symbol period can be under a condition where a glitch or switching boundary can result in undesired signal corruption where detailed analysis at a sub-period granularity can be desired.

Figure 3:
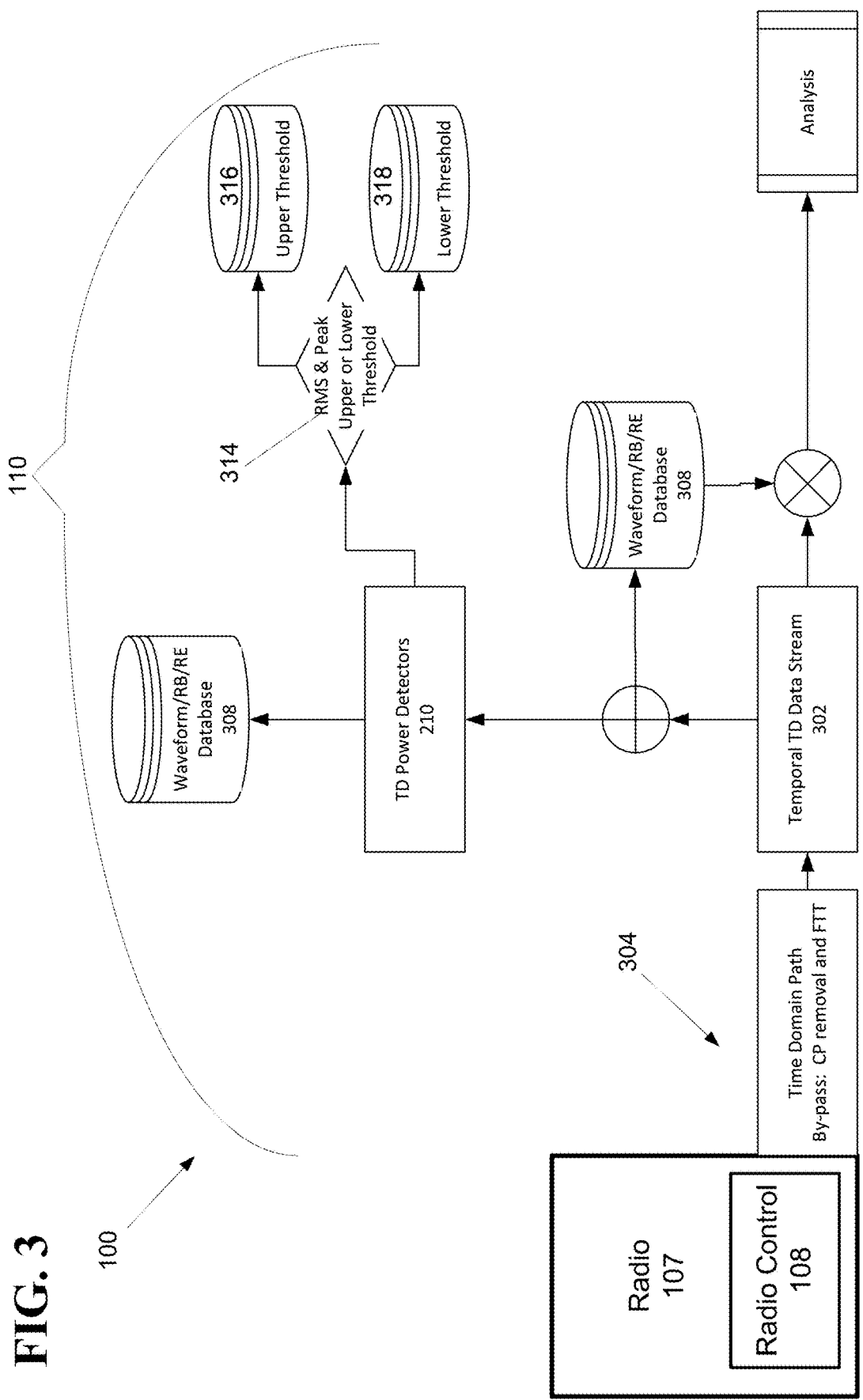
FIG. 3 illustrates a schematic diagram of the radio system of FIG. 1 with the radio hardware unit signal capture portion expanded, in accordance with one or more embodiments and/or implementations described herein.
Figure 4:
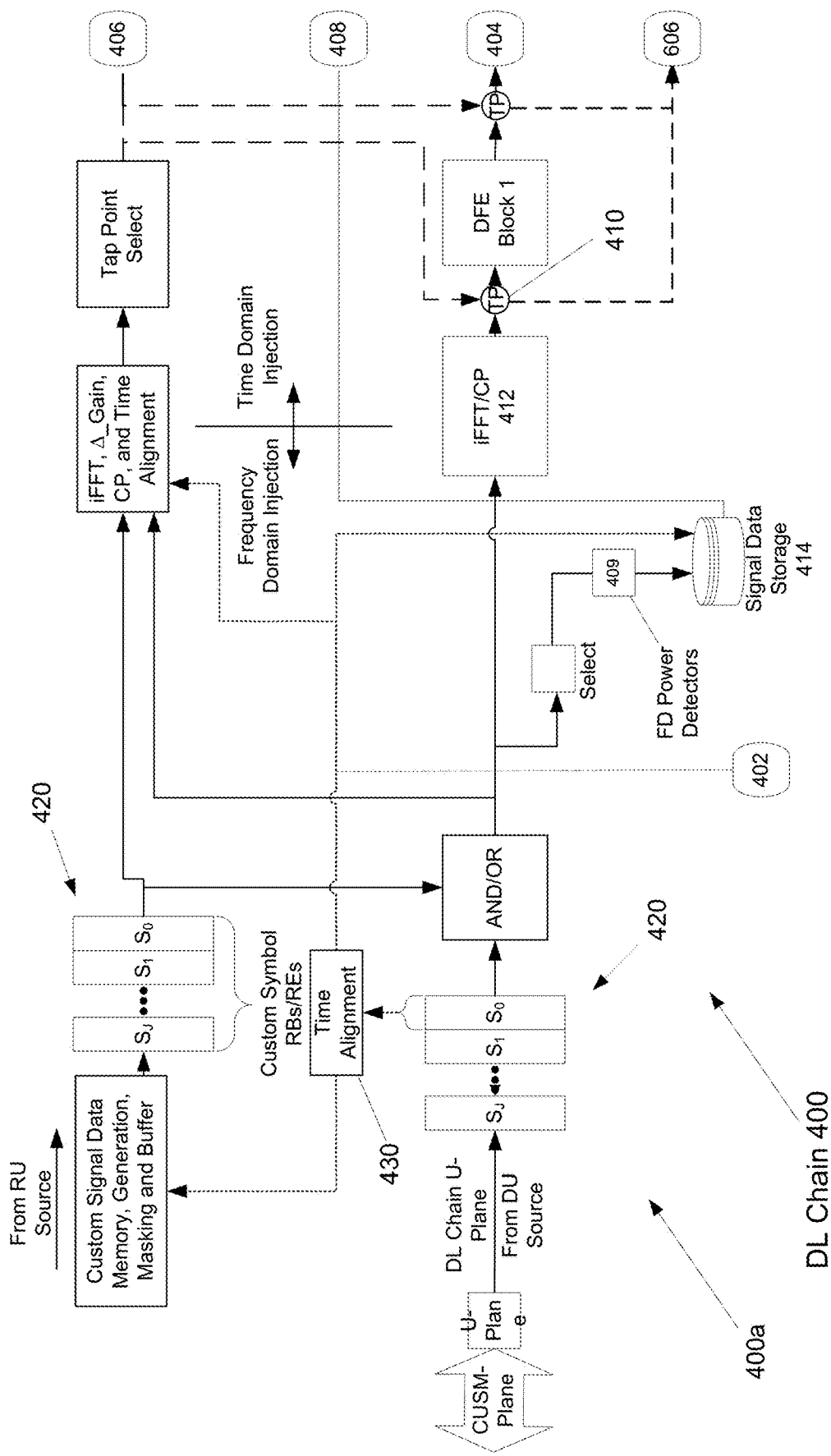
FIG. 4 illustrates a partial schematic diagram of a digital front end downlink chain of the radio of the radio system of FIG. 1, in accordance with one or more embodiments and/or implementations described herein.
Figure 5:
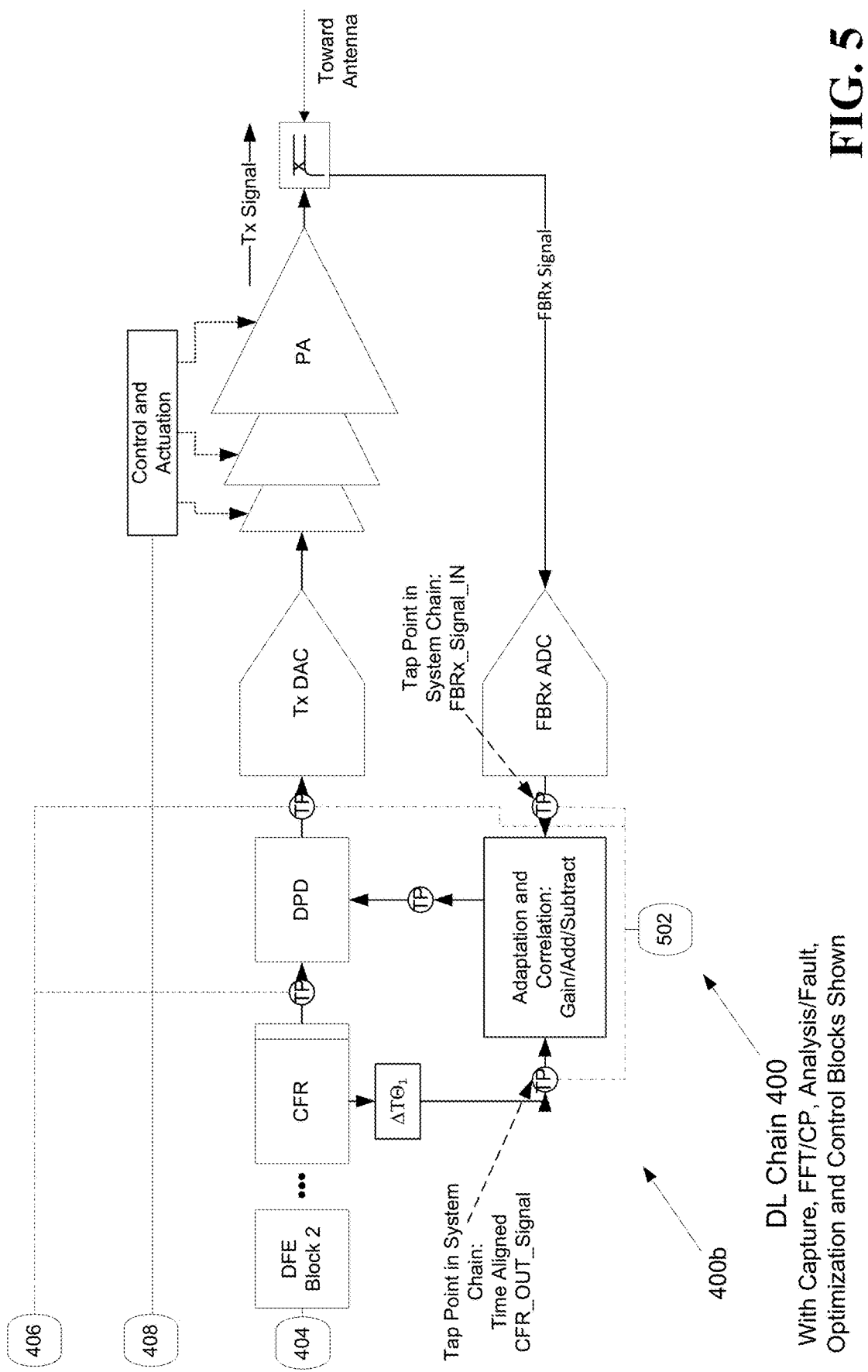
FIG. 5 illustrates another partial schematic diagram of a digital front end downlink chain of the radio of the radio system of FIG. 1, in accordance with one or more embodiments and/or implementations described herein.

In one or more embodiments, a time range over which power data can be defined by a gateable event, such as relative to one or more operations performed by one or more blocks of a DFE chain, such as the DFE chain 304 (FIG. 3), UL chain 600 (FIGS. 6 and 7) and/or DL chain 400 (FIGS. 4 and 5).

In one or more embodiments, the radio data analysis system 200 can comprise the machine-readable memory 209 that can be operably connected to the processor 207. The memory 209 can store computer-executable instructions that, upon execution by the processor 207, can cause the processor 207 and/or one or more other components of the radio data analysis system 200 (e.g., power detector 210, read circuit 211, delaying circuit 218, measurement circuit 214, analysis component 218 and/or accumulator/counter circuit 220) to perform one or more actions. In one or more embodiments, the memory 209 can store one or more computer-executable components.

Radio data analysis system 200 and/or a component thereof as described herein, can be communicatively, electrically, operatively, optically and/or otherwise coupled to one another via a bus 205 to perform functions of non-limiting system architecture 200, radio data analysis system 200 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, radio data analysis system 200 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, radio data analysis system 200 can comprise one or more computer and/or machine readable, writable and/or executable components and/or instructions that, when executed by processor 207, can facilitate performance of one or more operations defined by such component(s) and/or instruction(s).

Turning now to additional elements of the radio data analysis system 200, time domain (TD) power detection can be performed on data within a data stream of a digital front end (DFE) of a radio system, where such data is natively in time domain Ability to detect power in the time domain can allow for the ability to precisely extract the power of a signal at a period, multiple period or sub-period time range, for example. Power detection can be implemented at a location coupled to, but spaced from, such as coupled near, an input to the radio system, such as at various tap points spaced along (e.g., between) a DFE's various blocks (e.g., of an uplink chain or a downlink chain). Time alignment of this data can enable input to output data comparison, input to input comparison and/or output to output comparison.

Turning first to the power detector 210, which can be a time domain (TD) power detector, while the TD PD 210 is shown as part of the radio data analysis system 200 the power detector 210 can be additionally and/or alternatively part of the RU signal capture portion 110.

Power detectors are RF components that can convert an RF input signal into an output voltage and/or a digital and/or digitized representation thereof that can be proportional to the incident RF power. Power detectors can be employed for operations relative to automatic gain control circuits, transmit antenna power monitoring, and/or protecting sensitive circuits from pulses and/or power spikes.

The power detector 210 can be any suitable power detector, such as conventionally known by those having skill in the art. In one or more embodiments, the power detector 210 can be capable of reading time domain power data. In one or more embodiments, the power detector 210 can be configured to read and/or detect RMS power/current data and/or peak power/current data. That is, the power detector 210 can be both RMS and peak, temporally and/or over frequency.

Figure 6:
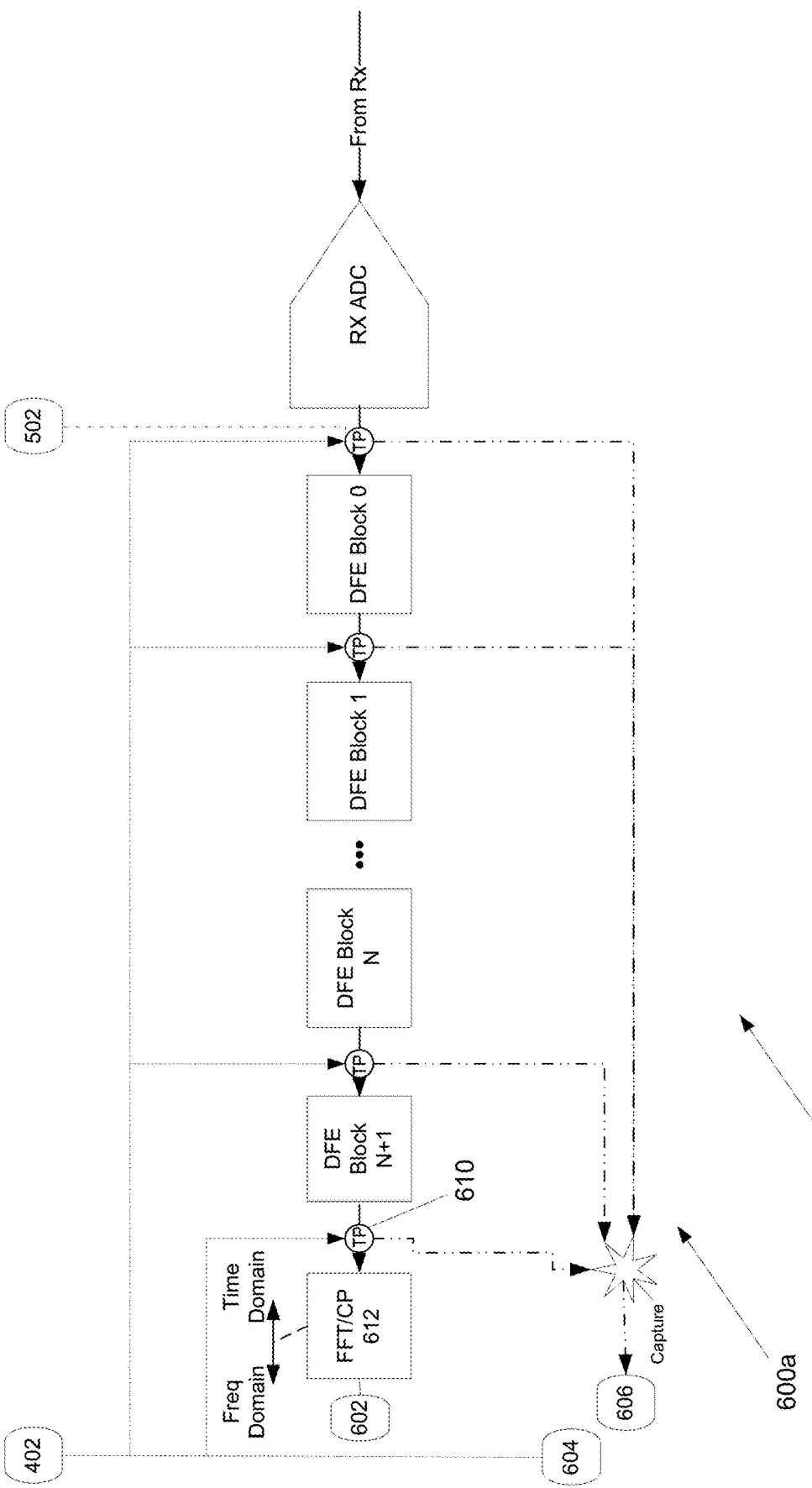
FIG. 6 illustrates a partial schematic diagram of a digital front end uplink chain of the radio of the radio system of FIG. 1, in accordance with one or more embodiments and/or implementations described herein.
Figure 7:
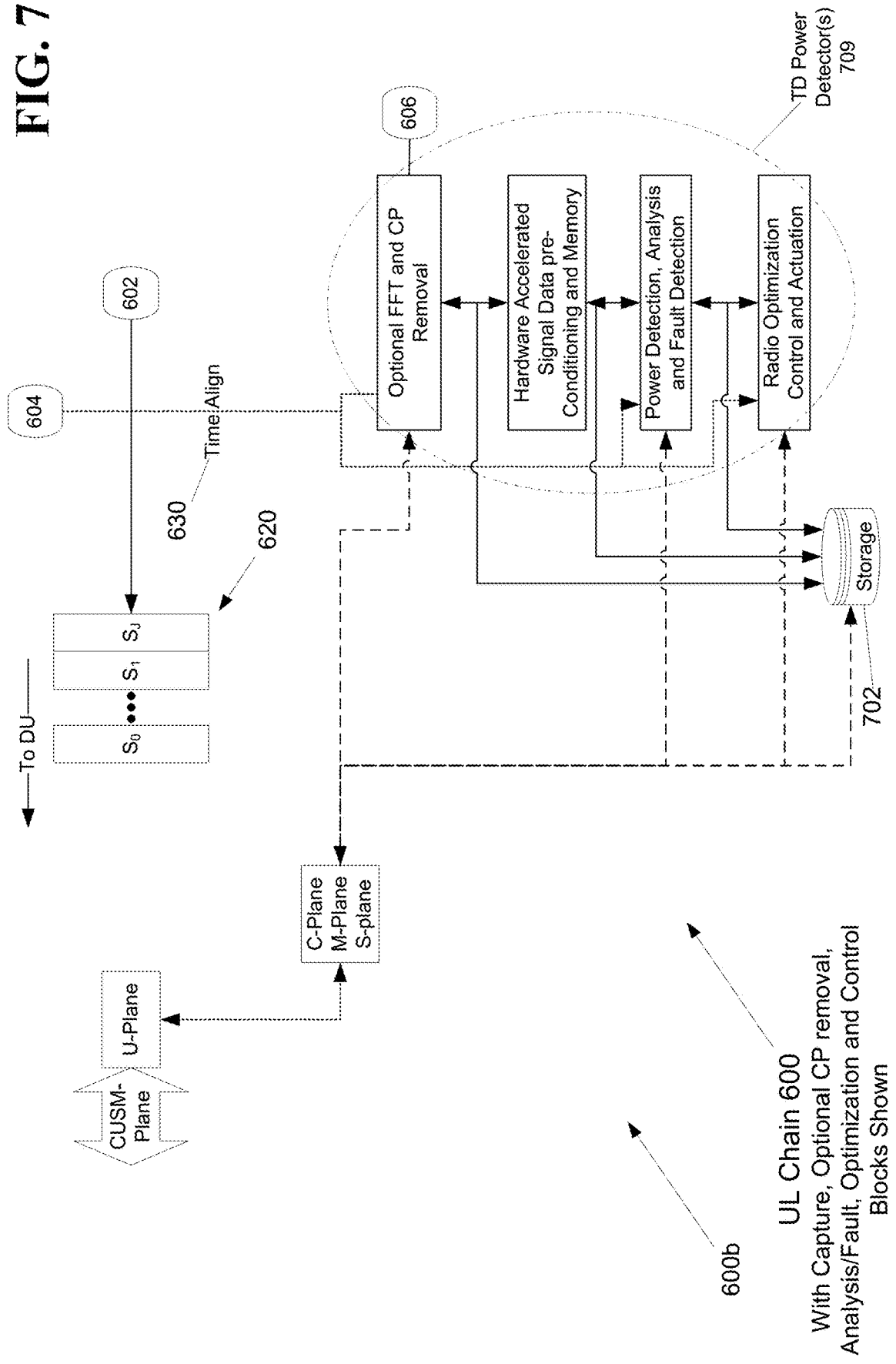
FIG. 7 illustrates another partial schematic diagram of a digital front end uplink chain of the radio of the radio system of FIG. 1, in accordance with one or more embodiments and/or implementations described herein.

The power detector 210 can be coupled to a digital front end (DFE) uplink (UL) or downlink (DL) chain, such as of the radio 107, for accessing the time domain representation of a plurality of subcarriers 250 of the radio 107. For example, as illustrated at FIGS. 4 to 7, the power detector representation 709 can be comprised by and/or separate from the power detectors 210. It is appreciated that power detectors 210 and 709 can be interchangeable. Also, at FIGS. 4 to 7, the power detector representation 709 can stem from various power detector tap points, including 410 and 610, but also including various other unlabeled tap points TP of the DL chain 400 (FIGS. 4 and 5) and/or UL chain 600 (FIGS. 6 and 7).

These schematics of FIGS. 4 to 7 show an additional layer of detail as compared to the schematic illustration of FIG. 3. It is noted that the DL chain 400 and UL chain 600 have are separately shown, and also are split into portions for purposes of detailed illustration. For example, DL chain portions 400a and 400b and UL chain portions 600a and 600b are coupled to one another at least at connection points 402, 404, 406, 408, 502, 602, 604 and 606.

The power detector 210 can comprise a read circuit 211. The read circuit 211 can be communicatively coupled to the processor 207 and can be at least partially controlled by the processor 207 to read, at the radio system 100, such as at UL chain 600, DL chain 400, and/or at other various tap points at the radio system 100, power data in a time domain. This power data can be native power data at UL chain 600m DL chain 400 and/or at other various tap points at the radio system 100.

As illustrated at FIG. 3, one or more power detectors 210, and thus also respective read circuits 211, can read data from a temporal TD data stream 302. The power detectors 210 can read power data across at least a portion of a downlink chain or uplink chain of the DFE (e.g., a DFE chain 304). The power detectors 210 can read such power data along a selected time range that can be defined by a specified upper limit of time and a specified power limit of time of the radio system 100, which can be aligned at time boundaries of the radio systems, such as symbols. For example, the read circuit 211 can read power data at a defined granularity based on a period of one symbol of time of the time domain. In one or more embodiments, the granularity can be that of a selected sampling rate, such as 491.52 Msps. The power detectors 210 can be configured to employ one or more databases, such as a waveform/resource block (RB)/resource element (RE) databases 308 to therefore detect, recognize and/or convert data from the temporal TD data stream 302 to power data in the time domain.

The power data can be read by the read circuit 211/power detector 210 at various locations of such a power detector 210, such as illustrated at various tap points (TP) at FIGS. 4 to 7, such as tap point 410 (FIG. 4) and tap point 610 (FIG. 6). It is noted that conventional radio system DFE chains do not comprise resources for transferring data within the DFE at an accelerated rate. Here, generally, the radio system 100 can haul TD data using unused resources in one or more DFE, UL and/or DL chains, for example. In one or more embodiments, the radio system 100 can forward, e.g., by the processor 107 and/or power detectors 210, time domain power data from separate tap points to a logical collection and/or storage point in the DFE chain (e.g., storage 414 and/or 702) by sharing the existing uplink (UL) DFE paths for different branches during a downlink (DL) time domain duplexing (TDD) period. Put another way, the read circuit 211 can be configured to transmit the power data in the time domain along a chain of the radio system 100 other than the chain at which the tap point/power detector is positioned/located/operating. In one or more embodiments, such "hauling" or "forwarding" of time domain data can comprise transforming time domain data to frequency domain data on/at a respective UL enhanced common public radio interface (eCPRI) link. For example, looking to FIGS. 4 to 7, data from various tap points (TP) can be forwarded between tap points, such as from the DL chain 400 to the UL chain 600. See, for example, the path at FIGS. 5 and 6 connected by connector 502. Forwarding can be operated over such representative paths.

UL data paths can be reverted back to normal live-air operation during TDD UL period. TDD can have a transmit Tx_ON state, where the transmit is ON, and a receive Rx_ON state where the transmit is OFF, and these states can be mutually exclusive. In one or more embodiments, TD data can be frequency shifted (DDC or DUC), filtered (FIR, HB), and/or decimated (/x) to select a sub-band, or lessen the amount of data collected as a requirement. An alternative desirable data processing option can be to sub-band (filter) the TD data.

In one or more embodiments, a read circuit 211 can perform one or more calculations directed to determining the power data in the time domain from information, signals and/or the like detected by the power detector 210.

As noted above, TD power data can be gathered based on RMS current or peak current specifications. As such, the power detectors 210 can be configured for RMS power and/or peak power applications.

In one or more embodiments, a read circuit 211 of the respective read circuits 211, can be configured to identify and/or to separately record peaks of power data that exceed one or more selected power data unit thresholds in the time domain. For example, this identification can be performed prior to initial storage and/or after initial storage. This "pre-conditioning" of data can allow for rapid analysis of bulk data, such as in a relatively real time fashion and/or at any other subsequent point in time, to thereby determine one or more current and/or historical characteristics of the radio system 100, such as radio system 100 operation, relative to the TD power data.

One or more actions can be taken relative to the preconditioned data to assist with radio system frequency, maintenance, customer experience and/or the like. In one or more embodiments, one or more actions can be triggered, such as by a respective ready circuit, such as relative to a quantity, quality and/or other aspect of the data read, collected and/or stored.

In one or more embodiments, a read circuit 211 can adjust a sampling rate of the power data in the time domain, such as of one or more particular power detectors 210, such as based on feedback from the processor 207, radio system CU and/or control datacenter 112.

In one or more embodiments, one or more gathered/read sets of power data can be time aligned relative to one or more other gathered/read sets of power data (e.g., data from UL chain 600 vs data from DL chain 400). For example, as shown at FIGS. 4 to 7, time alignment can be performed on the collected data, such as relative to 430 (FIG. 4) and/or 630 (FIG. 7). For example, blocks 430 and 630 can be blocks that collect information for time alignment (e.g., gating and/or markers) that can subsequently be used to accelerate processing of the data. For example, one or more blocks 430 and/or 630 can comprise, be communicatively coupled to and/or represent a measurement circuit 214 and/or a delaying circuit 218, as described below. It will be appreciated that such time alignment can be performed during power data collection, before initial power data storage and/or after power data is initially stored.

A measurement circuit 214 can be communicatively coupled to the processor 207 and can measure a selected time range along a defined portion of a DFE chain, such as a downlink chain (e.g., 400) or uplink chain (e.g., 600) of the radio system 100. Measurement data from the measurement circuit 214 can be correlated to the stored power data and/or to other measured data by the measurement circuit 214. For example, synchronizing resulting from the measurement data can be provided by one or more time stamps that can be stored with the power data and/or referenced to the power data. For example, various tap points (e.g., 410, 610) can be disposed between functional circuit elements of the downlink or uplink chains 400, 600, and signal time delay across the functional circuit elements can measured by the measurement circuit and stored to the collected power data by the group of power detectors 210.

Additionally, and/or alternatively, a delaying circuit 218 can be communicatively coupled to the processor 207, which delaying circuit 218 can delay a second set of power data in the time domain to thereby adjust a selected time range of the second set of power data to a selected time range of the first power data. For example, in one or more embodiments, the delaying circuit 218, such as in cooperation with the measurement circuit 214, can start, stop and/or pause collection of power data in the time domain at one or more time/event boundaries, such as to facilitate the delay. In such cases, one or more read circuits 211 can synchronously read the adjusted second set of power data and the first set of power data. The delaying circuit 218 can define an adjusted time range stamp comprising a measured adjustment in the time range of the second set of data, thus allowing for referencing of a correlation between the selected time range and the adjusted second time range to the power data.

Indeed, relative to the power detectors 210, read circuits 211, measurement circuit 214 and delaying circuit 218, the TD power data can be detected within a known time boundary over which respective measurement conditions are known and understood. In this way, capturing data across these time boundaries, and thus provision of an undetermined set of information, from one or more different symbols, can be avoided, unless particularly intentioned.

Instead, synchronization of TD power data, such as between UL and DL chains, and/or between/among various locations along the UL and DL chains, can be performed and/or otherwise provided. Also, such symbol/symbol alignment can ensure that the power data being compared/contrasted captured from different tap points can produce relevant and comparable results. Such comparison can be between UL and DL data and/or between data at different historical points in time.

In one or more embodiments, time alignment can be provided down to the clock level (e.g., via sampling bins). For example, if the clock is 491.52 Msps, the data captured at diverse tapping points can be synchronized to the system clock and 'clocked' on the proper clock edges. Time alignment of time-domain frequency converted data (passing through a DDC or DUC, or decimated data) can be maintained even if when it is transformed into different sampling regimes. When contrasting data streams from disparate locations in the DFE, it can be beneficial to align to the same clock edge for ease of processing. For example, since all of a system's clocks are maintained and/or derived from a common clock reference, then all time regimes can be based on a central clock source and time alignment of such time regimes therefore can be referenceable and lockable to one another via multiples of the source clock frequency.

Discussion now turns to statistical accumulation (e.g., statistical analysis of the TD power data and storage thereof) by the radio data analysis system 200.

The analysis component 218 can be communicatively coupled to the processor 207 and can be configured to compare the power data in the time domain to a power threshold, such as a current threshold. Such power threshold can be a root-mean-square (RMS) threshold or a peak value threshold. Based on a result of the power data being compared to the power threshold, the analysis component 218 can thus sort the power data into bins at a storage component communicatively coupled to and/or accessible to the processor 207. That is, the power threshold can be applied to separate the power data into root-mean-square or a peak values.

An advantage of the threshold counters can be to measure long term traffic load distribution by "binning" as shown in a typical Histogram, based on the settable threshold or thresholds. The result of the RMS and peak power detector measurements over a temporal period can then be stored in a suitable storage medium. It is noted that binning may be of a dimension covering many power ranges.

Figure 9:
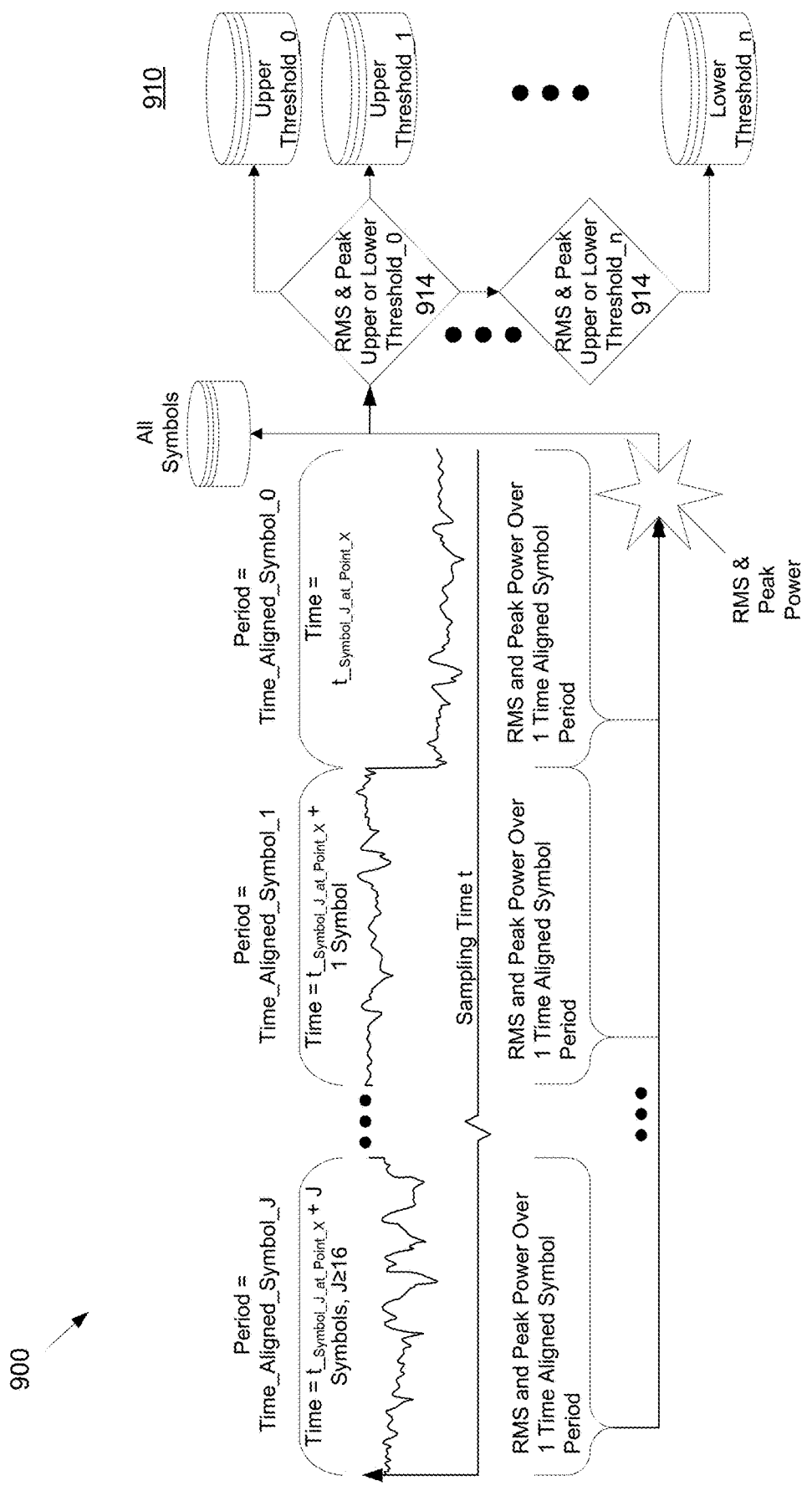
FIG. 9 illustrates a schematic representation of data being read, collected, and statistically analyzed over various time ranges, in particular periods of one symbol of time, in accordance with one or more embodiments and/or implementations described herein.

For purposes of illustration, turning again to FIG. 3, one or more thresholds 314 can be applied by the analysis component 218 to thereby sort power data in the time domain into various bins, such as upper threshold bin 316 and lower threshold bin 318. Indeed, as illustrated at FIG. 9, additional bins 910 can be employed, such as employing different bins for different thresholds 914 and/or threshold types. This can include different RMS thresholds, different peak thresholds, different thresholds for different subcarriers 250, for different groups of subcarriers 250, and/or for any combination thereof.

For example, if a power detector measurement is above the prescribed or programed threshold, a "RMS_UpperCounter" can be incremented. If the measurement is below the threshold a "RMS_LowerCounter" can be incremented.

For another example, if a power detector measurement is above the prescribed or programed threshold a "Peak_UpperCounter" can be incremented. If the measurement is below the programed threshold a "Peak_LowerCounter" can be incremented.

Furthermore, in one or more embodiments, such bins 910 (FIG. 9) can be temporary wherein the accumulator circuit or the counter circuit 220 can be configured to generate an interrupt signal triggering a copying or transferring of the power data from one or more of the bins 910 to one or more other bins, such as long-term storage bins or historical analysis bins. That is, put another way, an exemplary result of an interrupt may be to trigger a capture or data dump to more permanent memories or flight recorder.

Additionally, in one or more embodiments, the analysis component 218 can be configured to compare the power data in the time domain prior to stored power data in the time domain at a suitable storage component, such as the bins 910, memory 209, storage 702, storage 414 and/or the like. For example, based on the known time ranges of the data, and thus such datas being time aligned relative to one another, one or more current datas can be compared to one or more historical datas, such as automatically, and/or such as with respect to one or more gateable events. One or more thresholds can be employed for such comparison, with one or more triggers being initiated, such as by the analysis component 218, in response to one or more of such thresholds being met and/or exceeded. These operations can allow for automatic "pre-conditioning" of statistical data based on previously gathered data, which "pre-conditioned" data can be used in real time and/or at any subsequent time thereafter. In one or more embodiments, analysis of statistical data captured can be employed to generate, such as by the analysis component 218, a histogram distribution of power data detected. That is, data can be analyzed over time to determine radio system performance or beneficial system performance modifications.

It is noted that in one or more embodiments, time domain power data prior to any analysis operations (e.g., "pre-conditioning" operations") also can be stored, such as separately from analyzed data. This "clean" data can be stored at any suitable storage component, such as the bins 910, memory 209, storage 702, storage 414 and/or the like. This "clean" data can be used in connection with and/or separately from the "pre-conditioned" data. The "clean" data can be recalled at any suitable time for analysis and/or other use.

Next, an accumulator or counter circuit 220 can be communicatively coupled to the processor 207 and can be configured to record power data quantities stored at one or more of the bins at the suitable storage component. That is, TD power detector data can pass through a threshold filter where the output can further be counted and the count accumulated in an accumulator for ease of statistical analysis over time. It is noted that the TD power detector data can be assessed by the accumulator or counter circuit 220 before being binned and/or after being binned, such as where the data is recalled to the accumulator or counter circuit 220 after being binned.

Different counter circuits 220 can be employed for different subcarriers and/or for different analysis components 218. Thus, different analysis components 218 can be employed for different subcarriers and/or power detectors, where suitable.

Counter width can be dimensioned to capture sufficient information (e.g., a selected quantity) on performance parameters. For example, 15 minute intervals/histograms at 60 kHz subcarrier spacing (SCs) can be an exemplary temporal setting. Counter circuits 220 can be gateable in synchronization with radio system timing and states. An exemplary case can be Tx_ON/Rx_ON states, where Tx refers to "transmit" and Rx refers to "receive".

In one or more embodiments, the aforementioned "clean" time domain power data likewise can be submitted, transmitted and/or otherwise sent to the accumulator or counter circuit 220 prior to and/or after initial storage. For example, mere quantity of "clean" data can be "counted" and/or otherwise tracked. Storage of such counted "clean" data can be separate from any of the aforementioned datas.

In one or more embodiments, threshold measurements can also be used for measuring occurrence of extreme conditions or "spikes" in the power data detected. In one or more embodiments, the analysis component 218 and/or the counter circuit 220 can generate an interrupt or flag based on meeting and/or exceeding one or more of the sorting thresholds or based on one or more separate interrupt thresholds. In an exemplary case, detection can involve triggering a system event that affects system performance. In one or more embodiments, a trigger may not be generated by the analysis component 218 and/or the counter circuit 220 until a selected quantity of threshold interrupt events are statistically counted.

In one or more embodiments, a determination of low RMS and high peaks can trigger a decision to a radio controller of a respective radio system to clip a signal to improve efficiency. In one or more embodiments, a determination of blocker level before a filter can enable UL filter optimization.

In one or more embodiments, the analysis component 218 can enhance accuracy of the power data in the time domain that is detected by using information from the C-plane of the radio system (e.g., FIG. 7). In one or more embodiments, information from the C-Plane can be employed to accumulate data in a more precise fashion. For example, operation boost and reduction of power can not be considered for Tx-blanking info and therefore can be a possible source of error in power detection or traffic estimation applications. For another example, such data from the C-plane can be employed to further enhance the accuracy of power detected associated with data for reduced resource block (RB) count, which power can be not necessarily reduced due to boost.

Again referring FIGS. 4 to 7, and also FIG. 2, collected/read/gathered/statistically analyzed/clean data can be stored. As indicated above, one or more calculations and/or analysis can be performed during collection, prior to initial storage and/or after initial storage. Storage employed can be configured for recall of data for subsequent use and/or analysis. For example, the power data can be stored at a memory (e.g., memory 209) communicatively coupled to the processor 207 and configured to receive and store the power data in the time domain from the read circuit 211. The memory and/or other storage can initially be short-term memory, and thus a long-term memory 230 can be employed to which power data can be moved from the temporary or short-term memory. The long-term memory can be configured to store data longer than the temporary or short-term memory.

Figure 8:
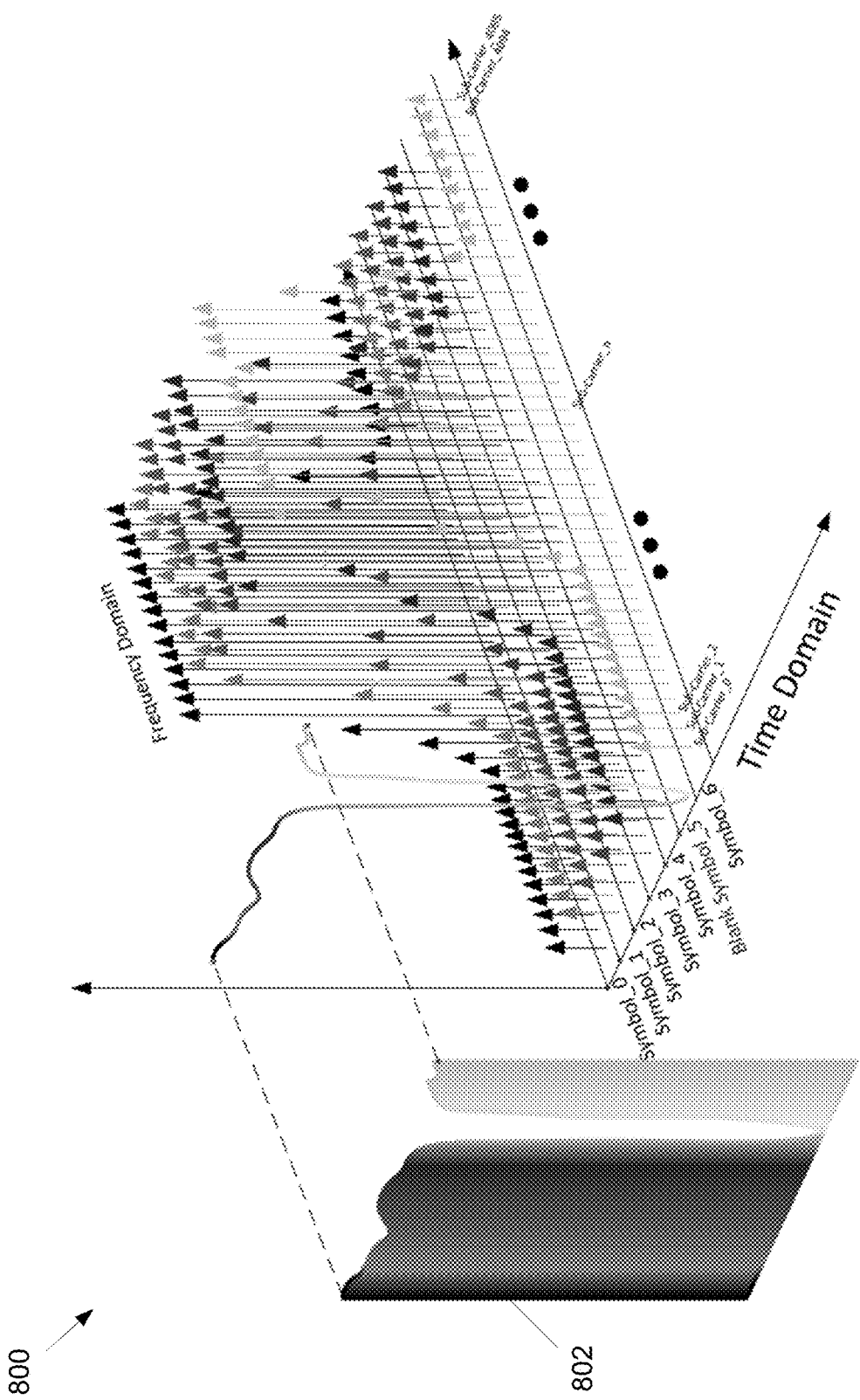
FIG. 8 illustrates a graph illustrating radio information at various time intervals, delineated periods of one symbol of time of a respective time domain, in accordance with one or more embodiments and/or implementations described herein.

Referring briefly to FIG. 8 and the graph 800, in one or more embodiments of the radio system 100, TD power data can be read/gathered/collected at defined time ranges along the time domain Such time domain data 802, as illustrated can be an alternative to frequency domain power data. Indeed, such time domain data 802 is not indicated relative to one or more subcarriers, but rather relative to a range of time, such as a portion of one or more symbols of time, in the context of 5G cellular, for example. Although, other intervals can be employed to define periods of time in a time domain.

For further illustration, turning to FIG. 9 and the schematic 900, various TD data, e.g., from the power detectors at tap points 410 and 610, can be gathered relative to various time intervals, such as periods, such as aligned at symbols of time. In one or more embodiments, all symbols of time of a respective time domain can be read, collected, gathered and/or analyzed by the radio data analysis system 200.

Figure 10:
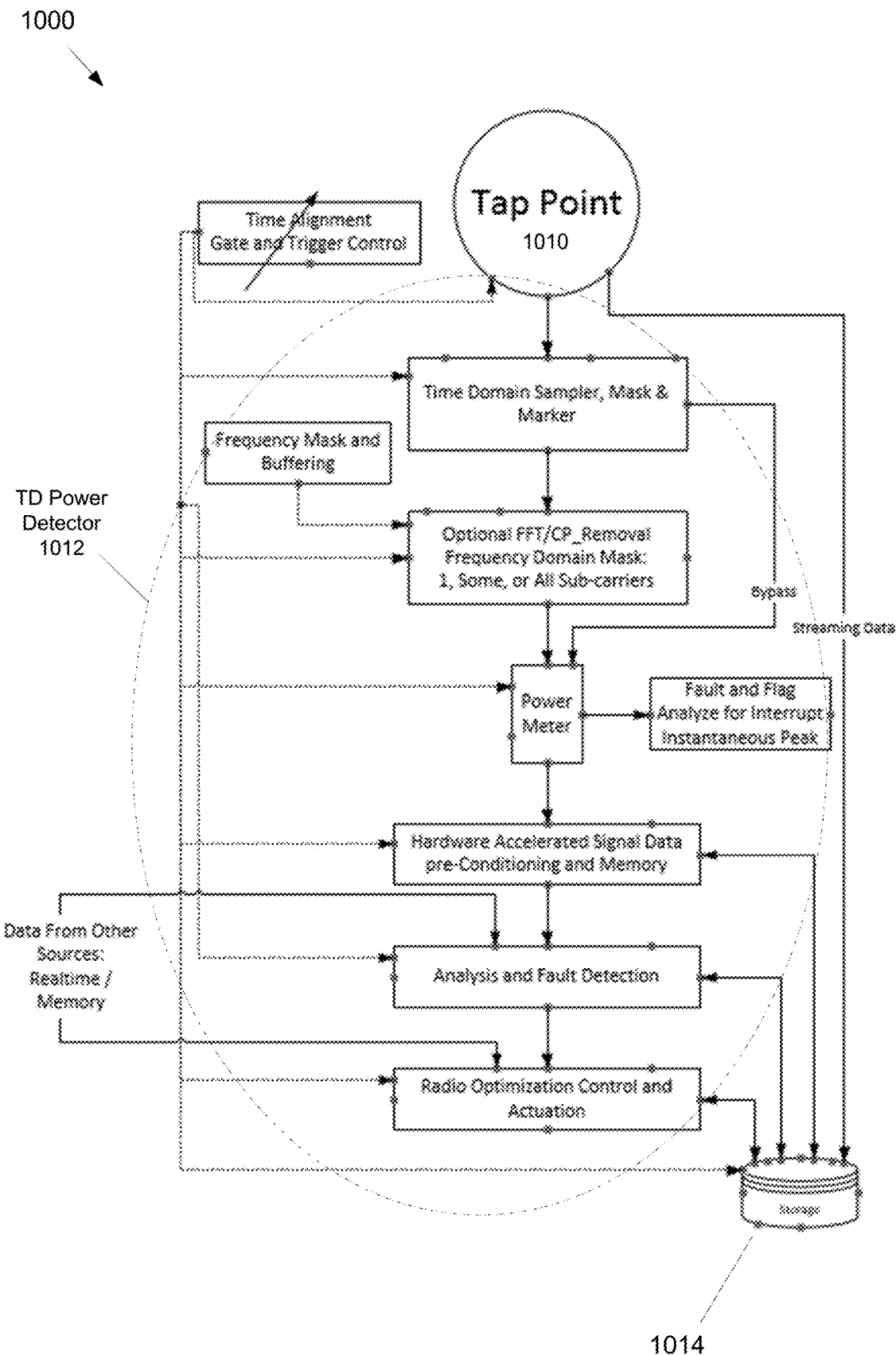
FIG. 10 illustrates a schematic diagram of a portion of the radio hardware unit of the radio system of FIG. 1, in accordance with one or more embodiments and/or implementations described herein.

Referring next to FIG. 10, detail is provided relative to a TD power detector 1012 at a tap point 1010. The TD power detector 1012 can be similar to the TD power detectors 210 discussed above, and thus discussion related to the TD power detectors 210 can equally apply to the TD power detector 1012 and/or vice versa. It is noted that any one of the aforedescribed tap points 410, 610 and/or TP, at which a power detector 210 can be located and/or coupled, can be replaced by the tap point 1010 and power detector 1012.

As illustrated, one or more operations can be performed, such as by the power detector 1012 and/or a by a respective processor. The one or more operations can comprise (and/or be employed for) time domain sampling, a frequency mask, buffering, CP removal, applying a frequency domain mask, fault and flag analysis for interrupt instantaneous peak, power monitoring, analysis and fault detection, radio optimization control and actuation, and/or the like. One or more of the operations can be performed prior to or via recall from storage 1014. It is noted that storage 1014 can be replaced by and/or supplemented by any of memory 209, storage 414, storage 702 and/or other storage of the radio system 100 and/or external thereto.

Referring now again to FIG. 2, in one or more embodiments, a group of TD power detectors 210, as illustrated at FIG. 2, can be collectively configured to control collection of TD power data from various tap points (e.g., 410, 610, TP) of radio system 100. The power detectors 210 of the group of power detectors can comprise respective read circuits 211 that can be configured to read the power data in a time domain, of along time ranges that can be defined relative to time boundaries of the radio system 100. The respective read circuits 211 can be further configured to read the power data in the time domain to a memory (e.g., memory 209 or other storage) communicatively coupled to and configured to receive and store power data. One or more measurement circuits 214 and/or delaying circuits 218 can perform one or more measurements, stampings and/or calculations to synchronize and/or correlate TD power data read at one TP from TD power data read at another TP.

The power detectors 210 of the group of power detectors can comprise statistical counters 220 that can be configured to receive the respective time domain power data having been sorted according to a power threshold, such as by the analysis component 218. In one or more embodiments, the statistical counters can be configured to accumulate respective counts of power data values at bins of a group of suitable data storage components. For example, a first number of the statistical counters can be set relative to a second number of the bins to result in the system 200 comprising at least one statistical counter per bin of the data storage component.

In one or more embodiments, a group of radio data analysis systems 200 can be provided at a radio system (e.g., radio system 100). Each radio data analysis system 200 of the group of systems can be configured to read and record power data in the time domain along respective different selected time ranges that each can be aligned at the radio system's (e.g., radio system 100) time boundaries.

In one or more embodiments, any of the aforementioned detecting, reading, measuring and/or delaying can be implemented at plural radio antenna branches of a same radio system, a different radio system, or relative to two or more carriers employing at least the radio system. In an exemplary case a radio data analysis system 200 can record power data for one, some, or all antenna branches, such as simultaneously.

In one or more embodiments, the radio data analysis system 200, such as the processor 207, can combine, such as at the memory 209 and/or other storage first power data in the time domain with second power data in a frequency domain of the same radio system 100, wherein the frequency domain can comprise data from one or more subcarriers from one or more time ranges (e.g., periods of time) of the radio system 100. In an exemplary case, signals when combined with TD (time domain) power detect and/or combined with open radio access network (ORAN) blocks and/or transmit (Tx) blanking information can enable aspects of determination of performance aspects of the radio system 100 not limited to system operations and/or maintenance.

Figure 11:
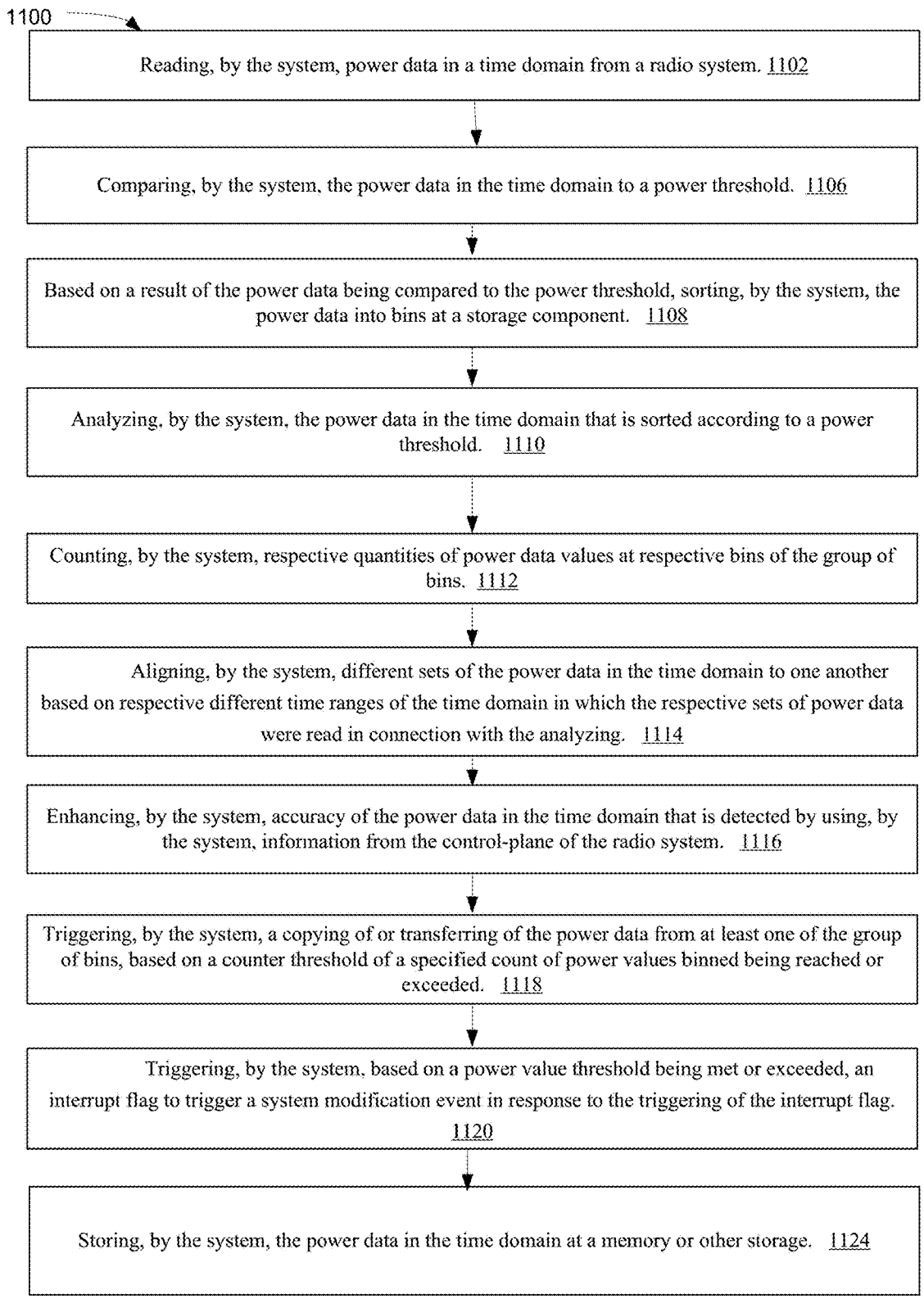
FIG. 11 illustrates a process flow diagram of a method of reading, collecting, statistically analyzing, and storing time domain power data of a radio system, in accordance with one or more embodiments and/or implementations described herein.

Turning now to FIG. 11, a process flow comprising a set of operations is illustrated relative to FIG. 2 for detecting, statistically analyzing, and/or storing time-aligned time domain power data, such as where the power data is natively in the time domain One or more elements, objects and/or components referenced in the process flow 1100 can be those of system 100 and/or system 200. Repetitive description of like elements and/or processes employed in respective embodiments is omitted for sake of brevity.

At operation 1102, the process flow 1100 can comprise reading, by the system (e.g., read circuit 211), power data in a time domain from a radio system.

At operation 1106, the process flow 1100 can comprise comparing, by the system (e.g., analysis component 218), the power data in the time domain to a power threshold.

At operation 1108, the process flow 1100 can comprise based on a result of the power data being compared to the power threshold, sorting, by the system (e.g., analysis component 218), the power data into bins at a storage component.

At operation 1110, the process flow 1100 can comprise analyzing, by the system, the power data in the time domain that is sorted according to a power threshold.

At operation 1112, the process flow 1100 can comprise counting, by the system (e.g., accumulator and/or counting circuit 220), respective quantities of power data values at respective bins of the group of bins.

At operation 1114, the process flow 1100 can comprise aligning, by the system (e.g., measurement component 214 and/or processor 207), different sets of the power data in the time domain to one another based on respective different time ranges of the time domain in which the respective sets of power data were read in connection with the analyzing.

At operation 1116, the process flow 1100 can comprise enhancing, by the system (e.g., measurement circuit 214 and/or processor 207), accuracy of the power data in the time domain that is detected by using, by the system, information from the control-plane of the radio system.

At operation 1118, the process flow 1100 can comprise triggering, by the system (e.g., read circuit 211 and/or accumulator or counting circuit 220), a copying of or transferring of the power data from at least one of the group of bins, based on a counter threshold of a specified count of power values binned being reached or exceeded.

At operation 1120, the process flow 1100 can comprise triggering, by the system, based on a power value threshold being met or exceeded, an interrupt flag to trigger a system modification event in response to the triggering of the interrupt flag.

At operation 1124, the process flow 1100 can comprise storing, by the system (e.g., memory 209 and/or read circuit 211), the power data in the time domain at a memory or other storage.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 1100 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can gather and statistically analyze time domain power data for enabling real-time adjustment of one or more parameters of a radio system. In an embodiment, a system can comprise a processor and a read circuit communicatively coupled to the processor, wherein the processor controls the read circuit to read power data in a time domain from a radio system, and an analysis component communicatively coupled to the processor, wherein the analysis component compares the power data in the time domain to a power threshold, and wherein, based on a result of the power data being compared to the power threshold, the analysis component sorts the power data into bins at a storage component communicatively coupled to the processor.

As a result, a method can be provided to read, collect, statistically analyze and/or store power data information for immediate and/or later analysis. One or more actions can be taken relative to the power data, to assist with radio system frequency, maintenance, customer experience and/or the like. In one or more embodiments, one or more actions can be triggered, such as relative to a quantity, quality and/or other aspect of the data read, collected and/or stored. A practical application of one or more techniques performed by one or more embodiments described herein can be collection of datas being time-aligned to one another relative to various tap point (data collection points) of a radio system.

Another practical application can be collecting statistics of current traffic of DL and UL on the RU side instead of the DU side of a respective radio system, such as where time domain data is native (e.g., on the DL/UL side). In this way, information can be gathered "upfront" to allow for any parameter adjustment. Such practical application can comprise the gathering and collecting of TD power data, and thus the building of TD power data statistics over time. Furthermore, in view of statistical analysis performed, one or more triggers can be implemented, such as for review and/or for automatic conditioning, modification, adjustment and/or the like of one or more aspects, parameters and/or characteristics of a respective radio system.

Such comparable data can be beneficial for a variety of applications, as described herein. For example, radio systems typically employ large quantities of power, and the one or more embodiments described herein can, through data collection and storage, facilitate reducing power consumption of a respective radio system. This can be facilitated through performance enhancements, firmware changes and/or upgrades, and/or over the air updates to customer equipment in the field (e.g., which are employing and/or can employ the respective radio system). Particular advantages can comprise, but are not limited to, reduction of occurrence/rate of no fault found (NFF) returns, cost of field returns, and/or customer outage occurrences/times.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide data collection, such as time-aligned data collection in the time domain, as compared to existing systems and/or techniques. Systems, computer-implemented methods and/or computer program products facilitating performance of these processes are of great utility in the field of data storage and/or radio system management and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively collect and statistically analyze time domain data from a DFE chain in the time that one or more embodiments described herein can facilitate this process. And, neither can the human mind nor a human with pen and paper electronically collect and statistically analyze time domain data from a DFE chain as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 12:
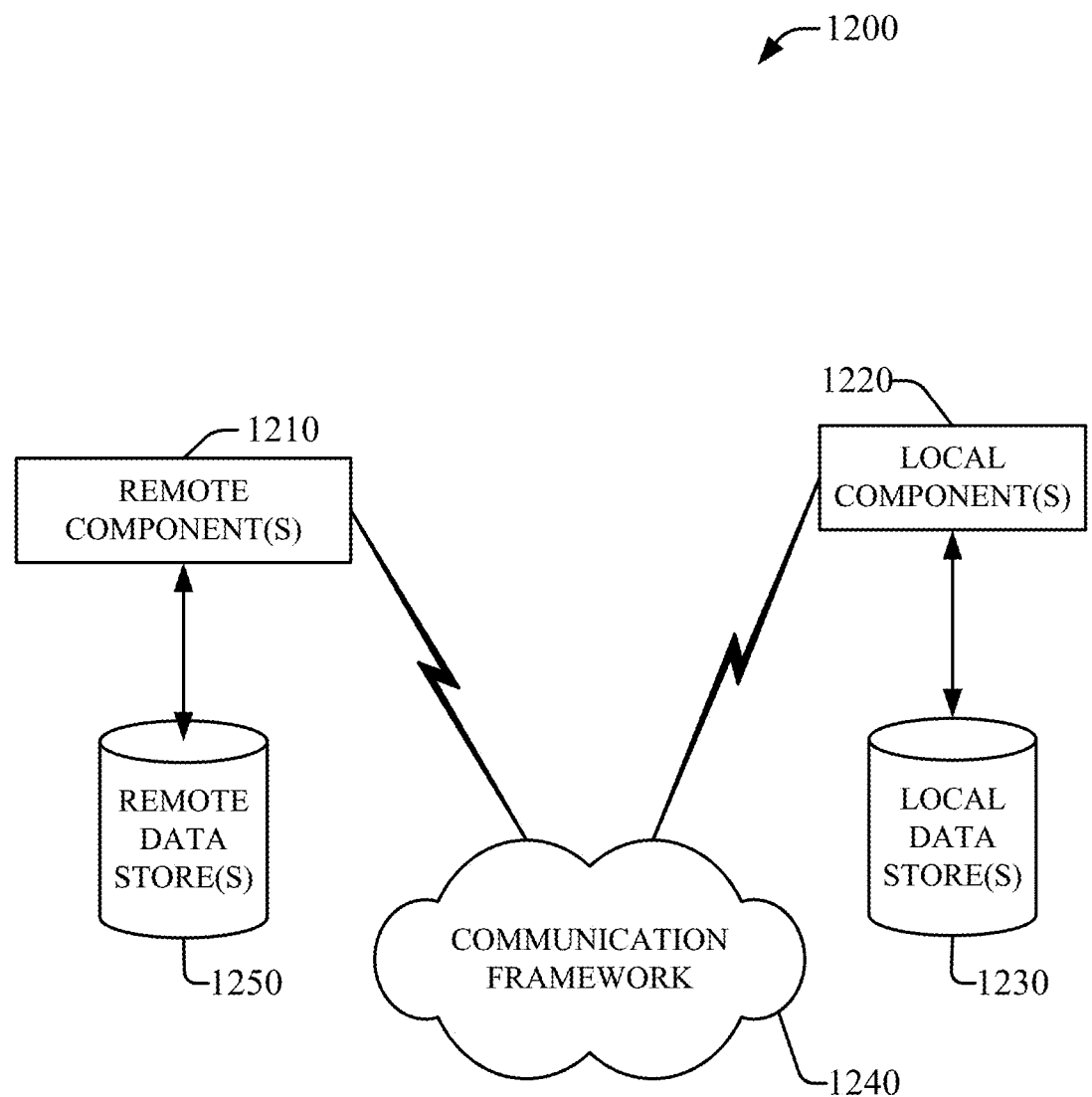
FIG. 12 illustrates a block diagram of an example operating environment into which embodiments of the subject matter described herein can be incorporated.

FIG. 12 is a schematic block diagram of an operating environment 1200 with which the described subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Example Computing Environment

Figure 13:
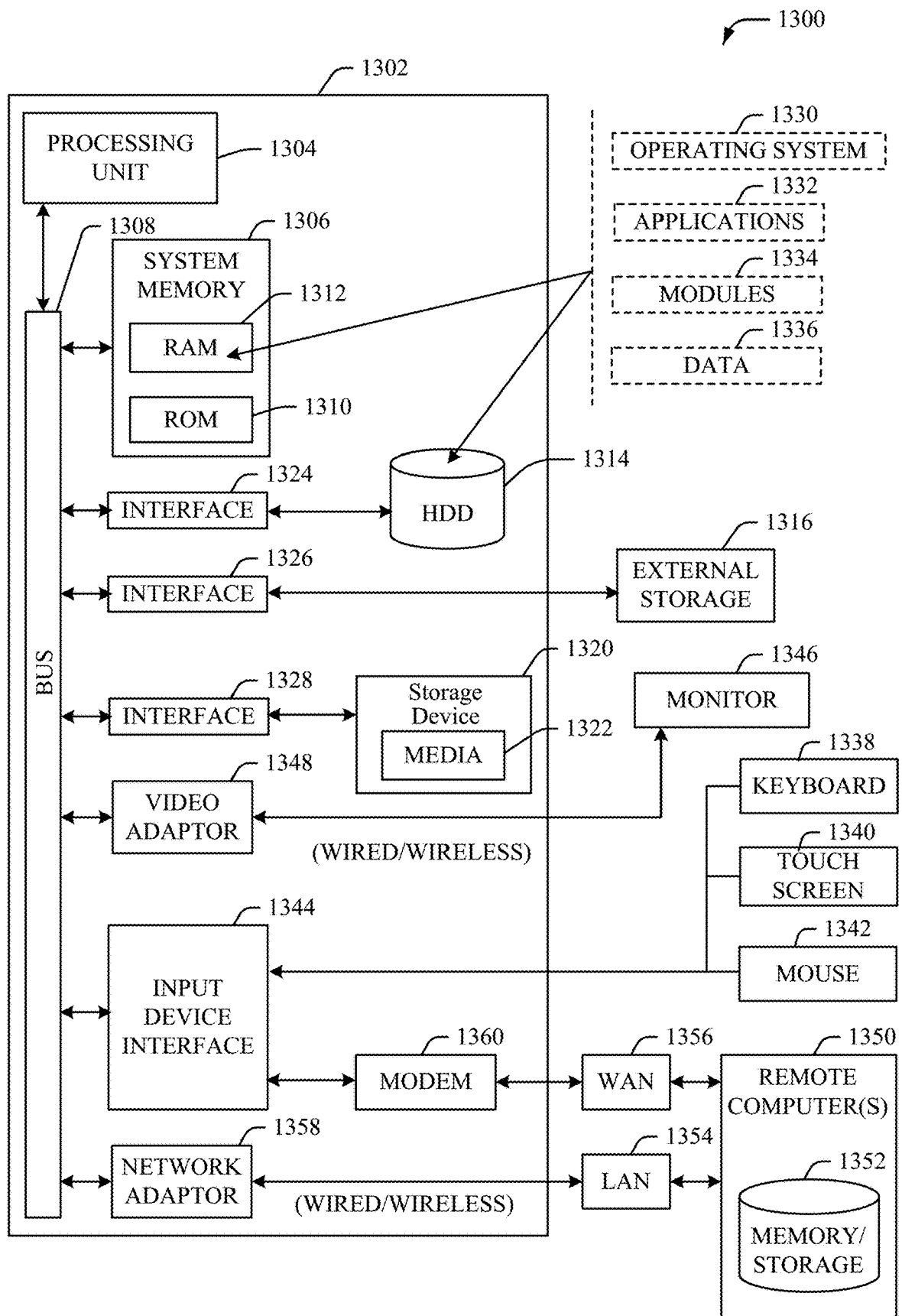
FIG. 13 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 13, the example computing environment 1300 which can implement one or more embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. The network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
    power detectors configured to detect respective power data in a time domain from a group of locations along an uplink path or a downlink path of a radio system,
    wherein the power detectors are configured to detect the respective power data relative to respective different time ranges of the time domain,
    wherein the system is configured to correlate the different time ranges of the time domain to one another, and
    wherein the power detectors comprise respective statistical counters that are configured to accumulate respective counts of power data values, of the respective power data, at bins of data storage.

2. The system of claim 1, wherein the statistical counters are configured to receive the respective power data having been sorted according to a power threshold.

3. The system of claim 1, wherein a first number of the statistical counters is set relative to a second number of the bins to result in the system comprising at least one statistical counter per bin of the data storage.

4. The system of claim 1, further comprising:
    a processor that executes executable instructions to facilitate performance of operations, comprising:
    sorting the respective power data in the time domain according to a power threshold.

5. The system of claim 4, wherein the sorting comprises sorting the respective power data in the time domain according to identification of the respective power data in the time domain as respective root-mean-square power data or respective peak power data.

6. The system of claim 1, further comprising:
    a processor that executes executable instructions to facilitate performance of operations, comprising:
    copying or transferring power data, of the respective power data, from a first bin, of the bins, to a second bin, of the bins, wherein the first bin serves as temporary storage for the power data.

7. The system of claim 1, further comprising:
    a processor that executes executable instructions to facilitate performance of operations, comprising:
    comparing the power data values at the bins to historical power data values.

8. The system of claim 1, wherein the statistical counters are configured to trigger a notification based on a power data value, of the power data values, of the respective power data being determined to exceed a power threshold.

9. The system of claim 1, wherein the different time ranges comprise different periods of time across a time range, and wherein the different periods have different lengths of time.

10. A method, comprising:
    collecting, by a system comprising a processor, power data in a time domain from a radio system;
    detecting, by the system, the collecting of the power data; and
    correlating, by the system, different time ranges of the time domain to one another, wherein the different time ranges comprise different periods of time across a time range, and wherein the different periods have different lengths of time.

11. The method of claim 10, further comprising:
sorting, by the system, the power data according to at least one power threshold.

12. The method of claim 11, wherein a power threshold of the at least one power threshold is set based on historical information for the radio system.

13. The method of claim 10, further comprising:
identifying, by the system, a peak of the power data that exceeds a power threshold.

14. The method of claim 13, further comprising:
triggering, by the system, a notification that the peak of the power data exceeds the power threshold.

15. The method of claim 10, further comprising:
accumulating, by the system, a count of power data values of the power data at a bin of data storage.

16. The method of claim 15, wherein the bin is designated for storage of first power data, of the power data, detected via a corresponding statistical counter of the system.

17. A non-transitory machine-readable medium, comprising executable instructions that, when executed by a processor facilitate performance of operations, the operations comprising:
accumulating counts of power data values of power data collected by the system at a first set of bins of one or more data storage components,
wherein the power data was collected in the time domain from a radio system,
identifying a peak of the power data that exceeds a power threshold; and
triggering a notification that the peak of the power data exceeds the power threshold.

18. The non-transitory machine-readable medium of claim 17, wherein the power threshold is based on historical information for the radio system.

19. The non-transitory machine-readable medium of claim 17, wherein the operations executed by the processor further comprise:
sorting the power data into a second set of bins designated for analysis,
wherein the sorting comprises employing a set of power thresholds, comprising the power threshold, to separate power data values, of the power data, into a set of groups corresponding to the second set of bins.

20. The non-transitory machine-readable medium of claim 19, wherein the sorting further comprises correlating different time ranges of the time domain to one another.

* * * * *